(12) United States Patent
Ku

(10) Patent No.: US 6,765,149 B1
(45) Date of Patent: Jul. 20, 2004

(54) WALL BOX HAVING LIGHT DEVICE

(76) Inventor: Fa Chai Ku, P.O.Box 1282, Chang Hua (TW), 500

(*) Notice: Subject to any disclaimer, the term of this patent is extended or adjusted under 35 U.S.C. 154(b) by 0 days.

(21) Appl. No.: 10/673,064

(22) Filed: Sep. 26, 2003

(51) Int. Cl.7 .................................................. H02G 3/14
(52) U.S. Cl. ........................... 174/66; 174/67; 220/241; 200/297
(58) Field of Search .............................. 174/66, 67, 53, 174/55; 220/241, 242; D13/156; 439/491; D8/353, 350; 200/297

(56) References Cited

U.S. PATENT DOCUMENTS

| | | | |
|---|---|---|---|
| 4,733,330 A | | 3/1988 | Tanaka et al. ............... 361/356 |
| 4,835,343 A | | 5/1989 | Graef et al. ................... 174/66 |
| 5,041,698 A | | 8/1991 | Takagi et al. ................. 174/66 |
| 5,212,899 A | * | 5/1993 | Fandreyer ................ 40/661.11 |
| 5,675,125 A | * | 10/1997 | Hollinger ...................... 174/66 |
| 5,735,708 A | * | 4/1998 | Arnett et al. ............... 439/491 |
| 5,834,695 A | * | 11/1998 | Herbert ........................ 174/66 |
| 5,837,937 A | * | 11/1998 | Reese et al. .................. 174/66 |
| 6,172,301 B1 | * | 1/2001 | Goodsell ...................... 174/66 |
| 6,423,900 B1 | * | 7/2002 | Soules .......................... 174/66 |

* cited by examiner

Primary Examiner—Dhiru R Patel

(57) ABSTRACT

A wall box includes a housing having one or more switches and one or more orifices, a frame attached to the housing and having one or more light devices engaged through the orifices of the housing for generating lights, and a transparent cover plate attached to the housing and having an opening for receiving the switches of the housing and for exposing the switches. The lights generated by the light device may be emitted out through the transparent cover plate, for lighting dark environment. The cover plate includes a number of projections for light refracting purposes. A switch button may be used to actuate the light devices.

9 Claims, 4 Drawing Sheets

WALL BOX HAVING LIGHT DEVICE

BACKGROUND OF THE INVENTION

1. Field of the Invention

The present invention relates to a wall box, and more particularly to a wall box for mounting electric wiring devices or switches to wall members, and having a light device for generating indicating lights in dark environments.

2. Description of the Prior Art

Various kinds of typical wall boxes have been developed and provided for mounting electric wiring devices or switches to wall members, and comprise one or more plate members to be secured to the wall members.

For example, U.S. Pat. No. 4,733,330 to Tanaka et al., and U.S. Pat. No. 4,835,343 to Graef et al., and U.S. Pat. No. 5,041,698 to Takagi et al. disclose three of the typical wall boxes for mounting electric wiring devices or switches to wall members.

However, the typical wall boxes do not have any light devices for generating indicating lights, such that the typical wall boxes may not be clearly seen and found in dark environments.

The present invention has arisen to mitigate and/or obviate the afore-described disadvantages of the conventional wall boxes.

SUMMARY OF THE INVENTION

The primary objective of the present invention is to provide a wall box for mounting electric wiring devices or switches to wall members, and having a light device for generating indicating lights in dark environments.

In accordance with one aspect of the invention, there is provided a wall box comprising a housing including at least one switch provided thereon, and including at least one orifice formed therein, a frame attached to the housing, and including at least one light device attached thereto and engaged through the orifice of the housing for generating lights, and a transparent cover plate attached to the housing, and including an opening formed therein for receiving the switch of the housing, and for exposing the switch. The lights generated by the light device are emittable out through the transparent cover plate, for lighting dark environment.

The cover plate includes a plurality of projections extended therein for light refracting purposes.

The housing includes at least one lock cavity formed therein, the cover plate includes at least one catch extended therefrom, to engage into the lock cavity of the housing, and to detachably lock the cover plate to the housing.

The housing includes at least one aperture formed therein, the frame includes a switch button attached thereto, and extended out through the aperture of the housing, for being depressed to actuate the light devices. The cover plate includes an orifice formed therein for receiving the switch button, and for allowing the switch button to be partially extended out of the cover plate.

The housing includes at least one aperture formed therein, the frame includes a switch member attached thereto, and aligned with the aperture of the housing, for adjusting a brightness of the light device. The cover plate includes an aperture formed therein and aligned with the aperture of the housing, for allowing the switch member to be operated.

A photo-conductive resistance may further be provided for selectively actuating the light device. A variable resistance may further be provided for adjusting the brightness of the light device.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a rear perspective view of a cover plate of the wall box;

DETAILED DESCRIPTION OF THE PREFERRED EMBODIMENT

Figure 1:
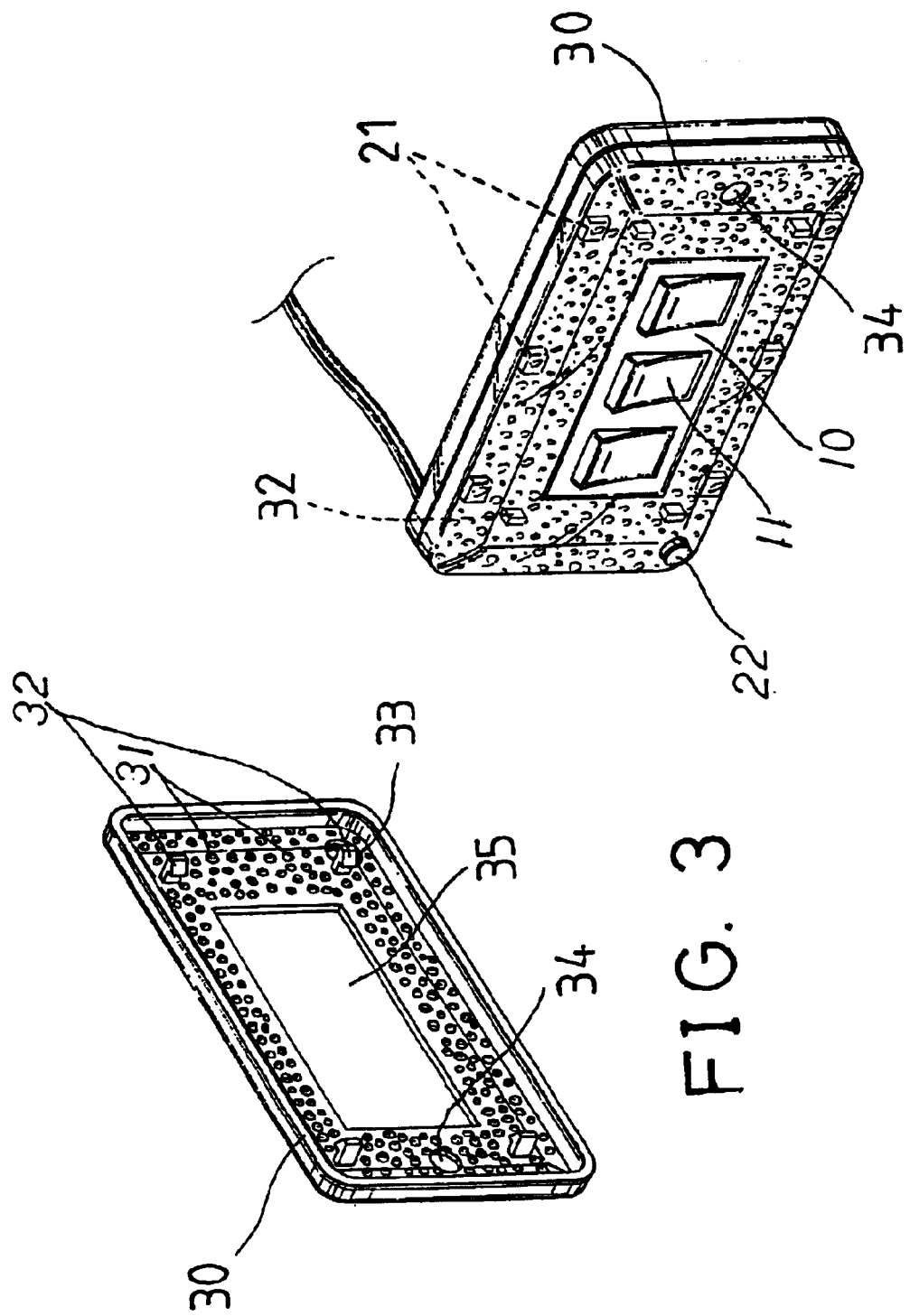
FIG. 1 is a perspective view of a wall box in accordance with the present invention.
Figure 2:
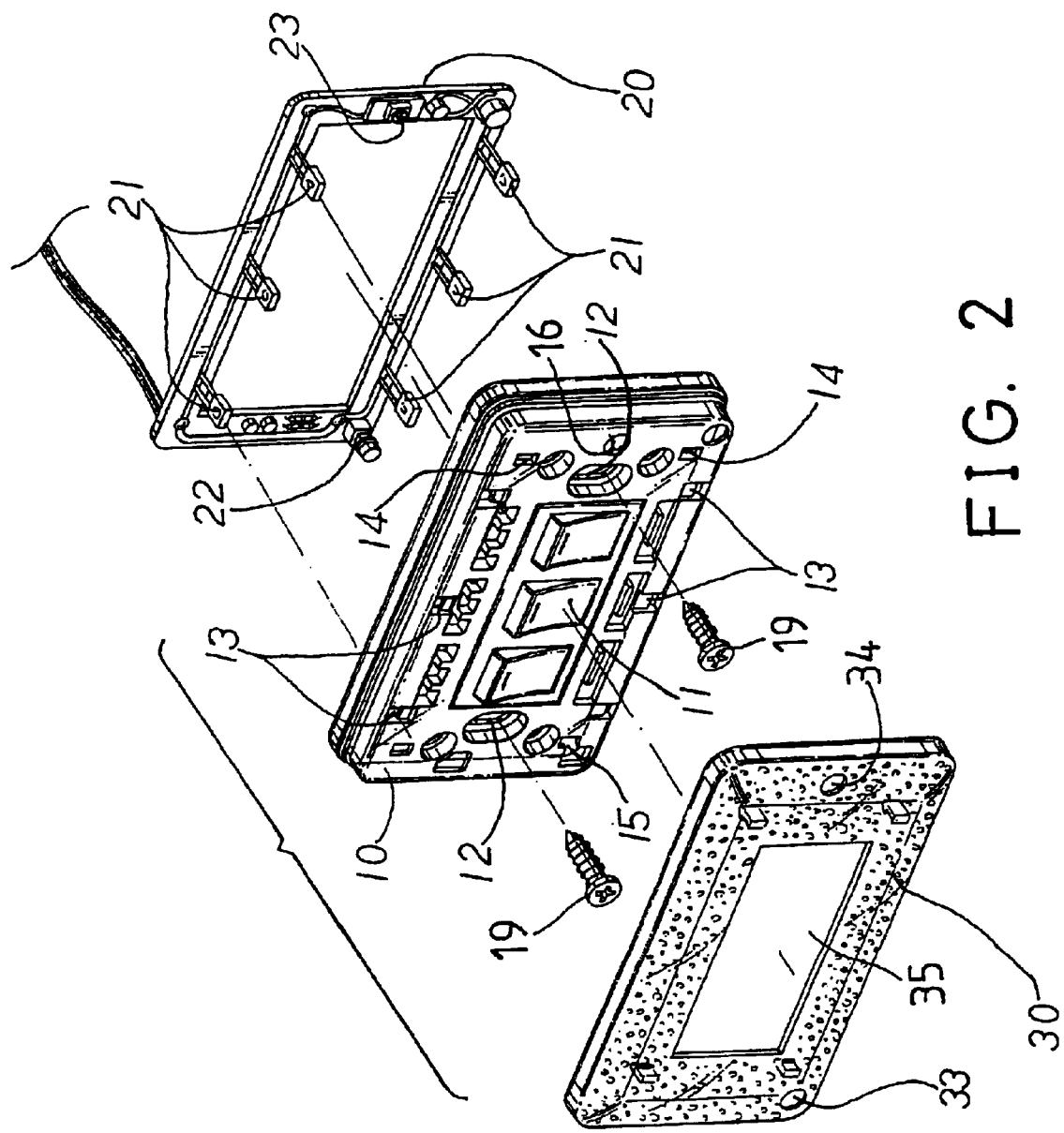
FIG. 2 is a partial exploded view of the wall box.

Referring to the drawings, and initially to FIGS. 1–5, a wall box in accordance with the present invention comprises a housing 10 for securing to a wall member 70 with fasteners 19 or the like, and including one or more switches 11 provided thereon, and including one or more holes 12 formed therein for receiving the fasteners 19, for example.

Figure 5:
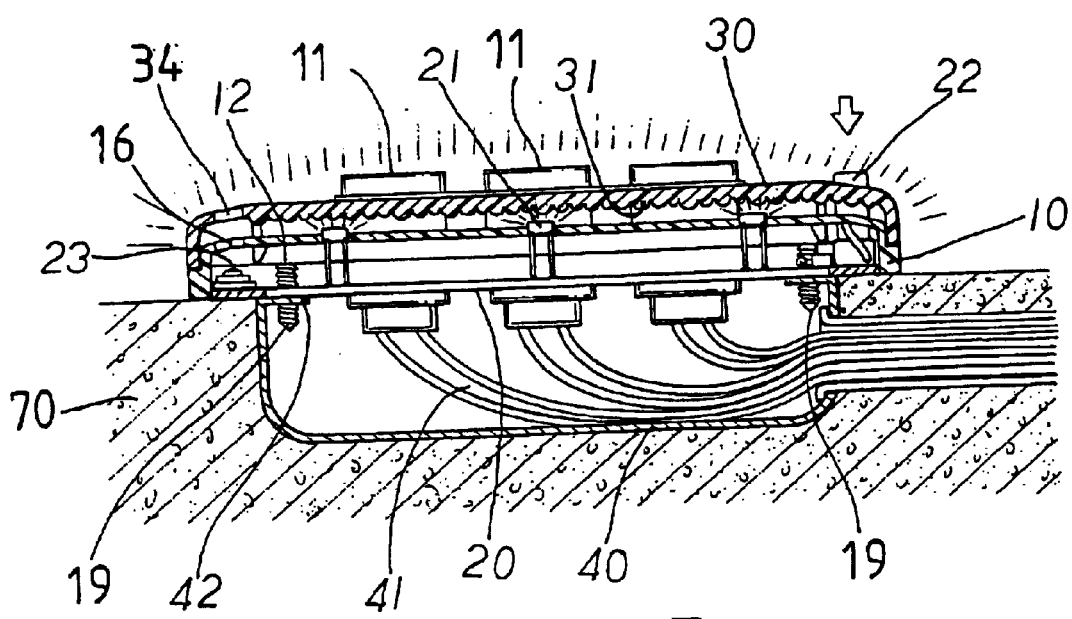
FIG. 5 is a cross sectional view of the wall box, taken along lines 5—5 of FIG. 4.

For example, a receptacle 40 may be engaged into the wall member 70, as shown in FIG. 5, and one or more electric wires or cables 41 may be received in the receptacle 40 and coupled to the switches 11, for coupling the switches 11 to electric power sources, or the like. The fasteners 19 may be threaded to the flanges 42 of the receptacle 40 for securing the housing 10 to the wall member 70.

The housing 10 includes a number of orifices 13, a number of lock cavities 14 and one or more apertures 15, 16 formed therein. A frame 20 is to be anchored and secured between the housing 10 and the wall member 70, and includes one or more light devices 21 secured thereto, such as the light bulbs, the light emitting diodes, or the like, and engaged through the orifices 13 of the housing 10, for emitting lights out through the housing 10.

The frame 20 includes a switch button 22 attached thereto, and extended out through one of the apertures 15 of the housing 10, for being depressed to actuate or to operate the light devices 21; and/or includes a switch member 23 attached thereto, and aligned with the other aperture 16 of the housing 10, for allowing the switch member 23 to be operated or actuated with such as a screw driver (not shown), in order to adjust the brightness of the light devices 21, for example.

A cover plate 30 includes a number of bulges or projections 31 extended or provided in the inner portion thereof, for light refracting purposes, and includes one or more hooks or catches 32 extended rearwardly therefrom, for engaging into the lock cavities 14 of the housing 10, and for detachably locking or securing the cover plate 30 to the housing 10.

The cover plate 30 includes an orifice 33 formed therein for receiving the switch button 22, and for allowing the switch button 22 to be partially extended out of the cover plate 30, and includes an aperture 34 formed therein for aligning with the switch member 23, and for allowing the switch member 23 to be operated or actuated with the screw driver (not shown).

The cover plate 30 includes an opening 35 formed therein, for receiving the switches 11, and for exposing the switches 11, and thus for allowing the switches 11 to be depressed or actuated or operated by the users.

Figure 4:
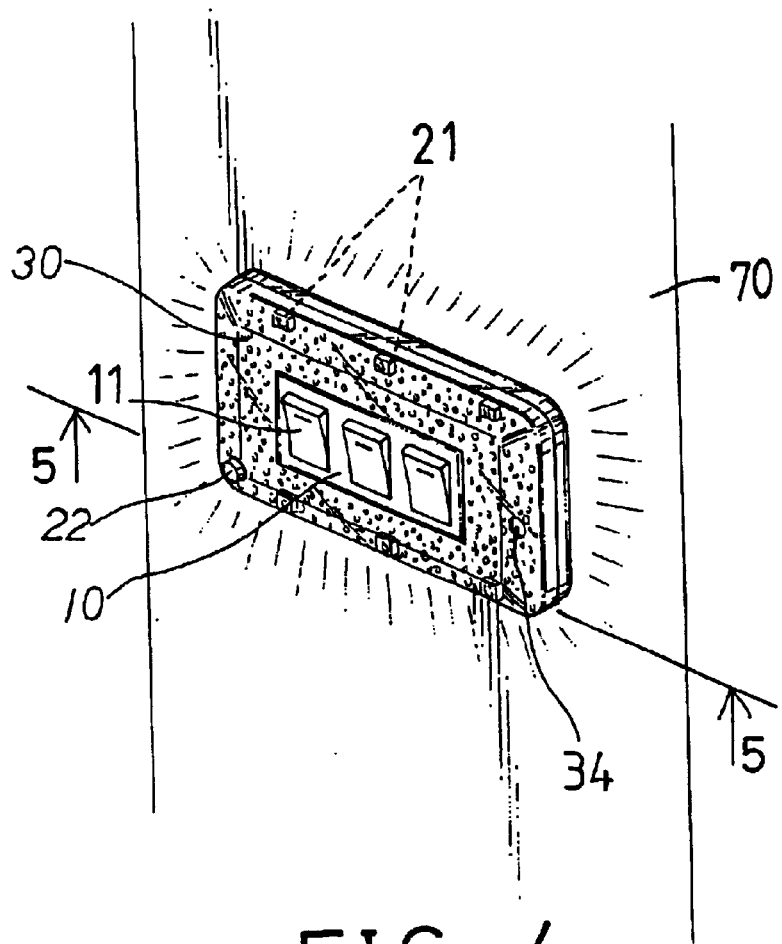
FIG. 4 is a perspective view illustrating the operation of the wall box.

In operation, as shown in FIGS. 4 and 5, the light devices 21 may be actuated or operated by depressing the switch button 22 of the frame 20, in order to energize the light devices 21 to emit or generate lights, when required. The brightness of the light devices 21 may be adjusted by the switch member 23, in order to emit or generate lights of the required or predetermined brightness.

The lights emitted or generated by the light devices 21 may be refracted by the bulges or projections 31 of the cover plate 30, in order to light the dark environment, for allowing the switches 11 to be easily operated by the users in the dark environment. The cover plate 30 and/or the bulges or projections 31 of the cover plate 30, and/or the housing 10 are preferably made of transparent or semi-transparent materials, and/or made of colorful materials, for allowing lights of various colors to be generated.

Figure 6:
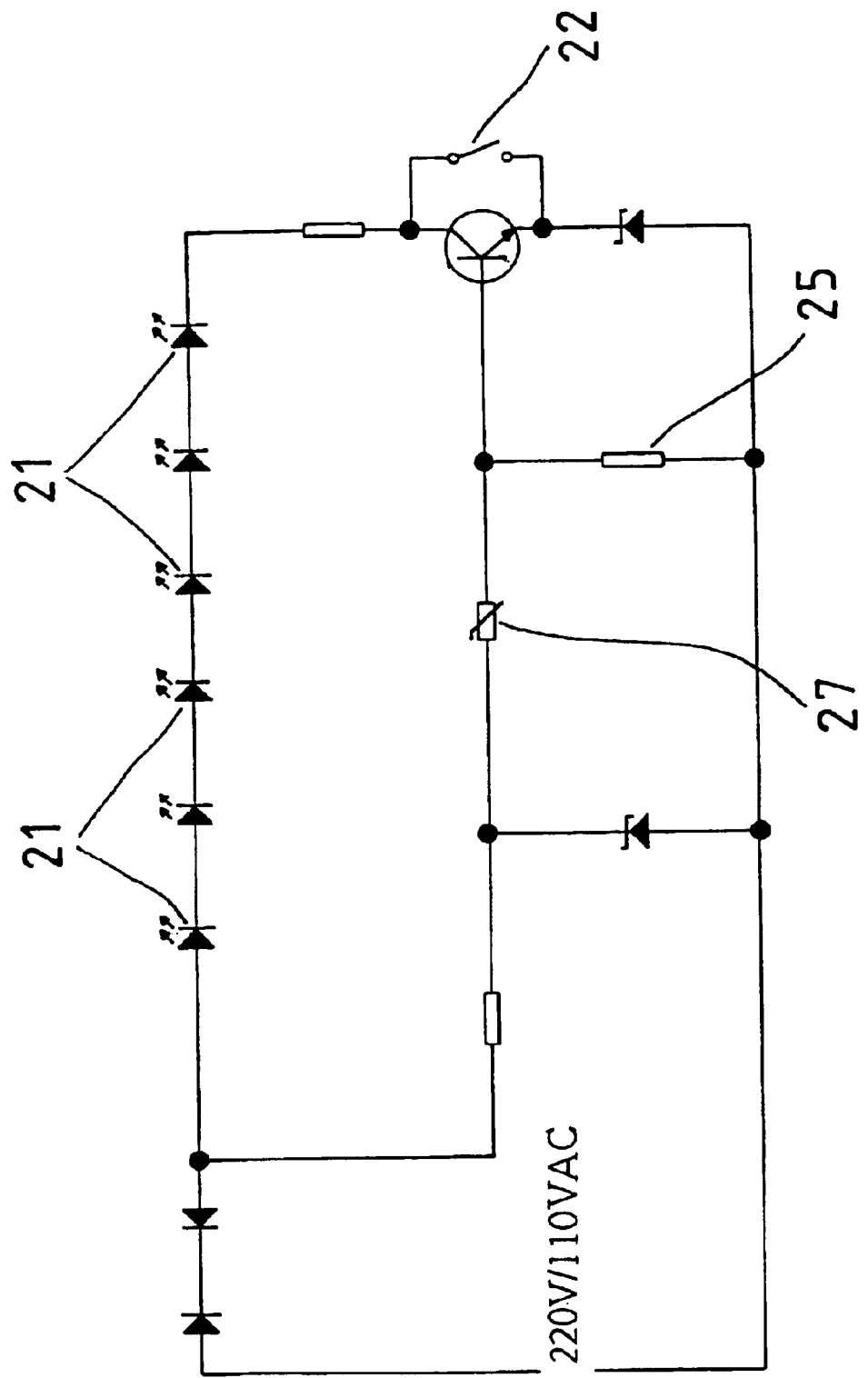
FIG. 6 is a plan schematic view illustrating an electric circuit of the wall box.

Referring next to FIG. 6, a photo-conductive resistance 25 may further be provided to actuate the light devices 21, in addition to the switch button 22, for allowing the light devices 21 to be actuated or energized by people or the like that move through the photo-conductive resistance 25. A variable resistance 27 may further be provided to adjust the brightness of the light devices 21, and may be a photo-conductive variable resistance 27.

Accordingly, the wall box in accordance with the present invention may be used for mounting electric wiring devices or switches to wall members, and having a light device for generating indicating lights in dark environments.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wall box comprising:

a housing including at least one switch provided thereon, and including at least one orifice formed therein, a frame attached to said housing, and including at least one light device attached thereto and engaged through said at least one orifice of said housing for generating lights, and a transparent cover plate attached to said housing, and including an opening formed therein for receiving said at least one switch of said housing, and for exposing said at least one switch, the lights generated by said at least one light device being emittable out through said transparent cover plate, for lighting dark environment.

2. The wall box as claimed in claim 1, wherein said cover plate includes a plurality of projections extended therein for light refracting purposes.

3. The wall box as claimed in claim 1, wherein said housing includes at least one lock cavity formed therein, said cover plate includes at least one catch extended therefrom, to engage into said at least one lock cavity of said housing, and to detachably lock said cover plate to said housing.

4. The wall box as claimed in claim 1, wherein said housing includes at least one aperture formed therein, said frame includes a switch button attached thereto, and extended out through said at least one aperture of said housing, for being depressed to actuate said at least one light devices.

5. The wall box as claimed in claim 4, wherein said cover plate includes an orifice formed therein for receiving: said switch button, and for allowing said switch button to be partially extended out of said cover plate.

6. The wall box as claimed in claim 1, wherein said housing includes at -least one aperture formed therein, said frame includes a switch member attached thereto, and aligned with said at least one aperture of said housing, for adjusting a brightness of said at least one light device.

7. The wall box as claimed in claim 6, wherein said cover plate includes an aperture formed therein and aligned with said at least one aperture of said housing, for allowing said switch member to be operated.

8. The wall box as claimed in claim 1 further comprising a photo-conductive resistance for selectively actuating said at least one light device.

9. The wall box as claimed in claim 1 further comprising a variable resistance provided for adjusting a brightness of said at least one light device.

\* \* \* \* \*